US011441327B2

(12) United States Patent
Cullen et al.

(10) Patent No.: US 11,441,327 B2
(45) Date of Patent: Sep. 13, 2022

(54) VEHICLE AWNING SUPPORT AND METHOD OF USE

(71) Applicant: PATRIOT CAMPERS HOLDINGS PTY. LTD., Molendinar (AU)

(72) Inventors: Brad Cullen, Molendinar (AU); Justin Montesalvo, Nerang (AU)

(73) Assignee: PATRIOT CAMPERS HOLDINGS PTY LTD., Molendinar (AU)

( * ) Notice: Subject to any disclaimer, the term of this patent is extended or adjusted under 35 U.S.C. 154(b) by 684 days.

(21) Appl. No.: 16/470,452

(22) PCT Filed: Dec. 19, 2017

(86) PCT No.: PCT/AU2017/051413
§ 371 (c)(1),
(2) Date: Jun. 17, 2019

(87) PCT Pub. No.: WO2018/112520
PCT Pub. Date: Jun. 28, 2018

(65) Prior Publication Data
US 2021/0332606 A1    Oct. 28, 2021

(30) Foreign Application Priority Data
Dec. 23, 2016    (AU) .............................. 2016905360

(51) Int. Cl.
*E04H 15/08*        (2006.01)
*B60R 11/00*        (2006.01)
*F16M 13/02*        (2006.01)

(52) U.S. Cl.
CPC .............. *E04H 15/08* (2013.01); *B60R 11/00* (2013.01); *F16M 13/022* (2013.01);
(Continued)

(58) Field of Classification Search
CPC combination set(s) only.
See application file for complete search history.

(56) References Cited

U.S. PATENT DOCUMENTS 2,948,288 A     8/1960  Nelson
3,050,074 A *   8/1962  Miller ..................... B60P 3/343
                                                        135/117
(Continued)

FOREIGN PATENT DOCUMENTS

JP      H08151825 A     6/1996
KR      1020150127981 A 11/2015
WO      2006/079017 A2  7/2006

OTHER PUBLICATIONS

PCT International Preliminary Report on Patentability from the International Application No. PCT/AU2017/051413 dated Apr. 15, 2019, 61 pages.

*Primary Examiner* — Monica E Millner
(74) *Attorney, Agent, or Firm* — Tucker Ellis LLP (57) ABSTRACT

The present invention concerns a vehicle awning support for supporting a vehicle awning on a vehicle, a vehicle awning assembly including the vehicle awning support and methods of use thereof. The vehicle awning support includes at least one vehicle mount for mounting the support to at least a portion of the vehicle, at least one vehicle awning mount for mounting the support to at least a portion of the awning and at least one arm extending between the mounts. The arm is moveable between a retracted position in which the vehicle awning is located adjacent the at least a portion of the vehicle and an extended position in which the vehicle awning extends outwardly relative to the at least a portion of the vehicle.

20 Claims, 3 Drawing Sheets

(52) U.S. Cl.
CPC .......... *B60R 2011/004* (2013.01); *B60R 2011/0045* (2013.01); *F16M 2200/068* (2013.01)

(56) References Cited

U.S. PATENT DOCUMENTS

| | | | |
|---|---|---|---|
| 3,575,460 A | | 4/1971 | Kennedy |
| 3,934,924 A | | 1/1976 | Diliberti |
| 3,952,758 A | * | 4/1976 | Addison ............ E04F 10/0603 135/141 |
| 5,368,056 A | * | 11/1994 | Riggi, Jr. ................ B60P 3/343 160/67 |
| 5,558,145 A | | 9/1996 | Baka |
| 5,700,048 A | * | 12/1997 | Wade ...................... B60P 3/343 135/88.07 |
| 7,188,889 B2 | | 3/2007 | Wagner et al. |
| 7,344,182 B1 | * | 3/2008 | Weddell ............. E04F 10/0633 160/67 |
| 8,225,807 B1 | | 7/2012 | Cain |
| 9,739,072 B1 | * | 8/2017 | Melland ................. B60R 11/00 |
| 2003/0094833 A1 | | 5/2003 | Thompson et al. |
| 2011/0265836 A1 | * | 11/2011 | Wilkins .................. A45B 3/02 135/33.7 |
| 2014/0292020 A1 | * | 10/2014 | Gallo .................... B60J 7/1295 296/116 |
| 2016/0251872 A1 | | 9/2016 | Tucker |

\* cited by examiner

Figure 3

VEHICLE AWNING SUPPORT AND METHOD OF USE

RELATED APPLICATION DATA

This application is a national phase application of International Application No. PCT/AU2017/051413 filed Dec. 19, 2017 and published in the English language, which claims priority to AU 2016905360 filed Dec. 23, 2016, which are hereby incorporated herein by reference.

TECHNICAL FIELD

The present invention relates to a vehicle awning support, a vehicle awning assembly including the vehicle awning support and to methods of use thereof.

BACKGROUND

Vehicle mounted awnings or vehicle awnings are an increasingly common sight on off-road and touring vehicles. Like a traditional building mounted awning, a vehicle awning may be extended from a vehicle to provide shelter from adverse weather conditions, such as, e.g., sun exposure and rain.

Generally, a vehicle awning is mounted along an edge of a roof or upper surface of a vehicle so that the awning may be extended from the vehicle in a substantially horizontal direction.

A problem in general with the mounting of such vehicle awnings is that they are usually mounted at a fixed height, which does not suit all vehicle types, particularly vehicles having a low height or a small roof or upper surface area.

For example, a vehicle awning mounted along an edge of a roof or upper surface of a hatchback, sedan or station wagon is impractical as it will not allow a person to stand upright beneath the awning when extended.

Similarly, due to the small roof area of many coupe utility vehicles (also known as utes, pickup trucks or utility vehicles), it is not always possible to mount a vehicle awning along an edge of the roof or upper surface of the vehicle cabin. In such scenarios, the vehicle awning may be mounted along an upper edge of the cargo bed or tray, which, again, is impractical due to the low height of the awning when extended.

To solve the above problems, awning supports have been developed that include one or more extendable legs and/or gas springs or struts located at each end of the vehicle awning to vertically extend the vehicle awning to a desired height above the vehicle.

However, the applicant has found that such awning supports provide an inadequate solution. In particular, the applicant has found that such awning supports are typically difficult or fiddley operate, generally requiring more than one person to extend the awning supports and lock or secure them at a desired height.

SUMMARY OF INVENTION

Embodiments of the present invention provide a vehicle awning support, a vehicle awning assembly including the vehicle awning support and methods of use thereof, which may at least partially overcome at least one of the above-mentioned problems or provide the consumer with a useful or commercial choice.

According to a first aspect of the present invention, there is provided a vehicle awning support for supporting a vehicle awning on a vehicle, said support including:
at least one vehicle mount for mounting the support to at least a portion of the vehicle;
at least one vehicle awning mount for mounting the support to at least a portion of the vehicle awning; and
at least one arm extending between the mounts, said arm being moveable between a retracted position in which the vehicle awning is located adjacent the at least a portion of the vehicle and an extended position in which the vehicle awning is extended outwardly relative to the at least a portion of the vehicle.

According to a second aspect of the present invention, there is provided a vehicle awning assembly including:
a vehicle awning; and
at least one said awning support according to the first aspect for mounting the vehicle awning to at least a portion of a vehicle.

Typically, the vehicle awning assembly may include at least two awning supports, preferably located at or near either end of the vehicle awning.

Advantageously, embodiments of the present invention provide an awning support for supporting a vehicle awning atop a vehicle and for raising and lowering the vehicle awning relative to the vehicle. With the awning support of the present invention, a vehicle awning can be raised to a desired height to a allow a person to stand comfortably upright beneath the vehicle awning even when the vehicle awning is mounted to a vehicle having a low height or along an upper edge of a cargo bed or tray of a vehicle. In one embodiment, an adjustor controls the height. Moreover, the movement of the at least one arm of the awning support enables the vehicle awning to be raised and lowered by a single user with ease.

As used herein, the term "vehicle" may refer to any vehicle to which a vehicle awning may be mounted. Generally, the vehicle may be a land vehicle. However, in some embodiments, the vehicle may be a boat, for example.

The vehicle may include an unpowered vehicle towed by a powered vehicle, such as, e.g., a trailer, a caravan, a mobile home, a travel trailer, a camping trailer, a semi-trailer, a motorcycle trailer, a livestock trailer, a bicycle trailer, a rail carriage or any other unpowered vehicle.

Conversely, the vehicle may include a powered vehicle, such as, e.g., a car, a truck, a bus, a van, a sport utility vehicle ("SUV"), a four-wheel-drive vehicle, a pickup truck, a coupe utility vehicle (also known as a "ute") or any other like powered vehicle.

Generally, the vehicle may include an exterior surface to which the awning support of the present invention may be mounted, preferably a side surface or an upper surface, more preferably along an edge of the upper surface.

As used herein, the term "vehicle awning" may refer to any awning configured to be mounted either directly or indirectly to a vehicle.

The vehicle awning may usually include an elongate housing extending longitudinally between opposed ends and a retractable awning housed within the housing.

The housing may typically include at least an outward facing surface and an opposed vehicle facing surface extending between the opposed ends.

The outward facing surface of the housing may include an elongate opening extending at least partially between the opposed ends through which the awning may be extended from when in use.

The vehicle facing surface may typically be configured to be mounted to the vehicle.

The awning support may be of any suitable size, shape and construction and formed from any suitable material or materials enabling the support to support a vehicle awning, be mounted to at least a portion of a vehicle and be moveable between a retracted and an extended position.

Generally, the awning support may be formed from a durable and strong material or materials, such as, e.g., metal and/or plastic materials. Typically, the awning support may be formed from metal materials, such as, e.g., steel, aluminium, titanium or any alloy thereof.

As indicated, the awning support includes at least one vehicle mount for mounting the support to at least a portion of a vehicle, preferably a portion at or near an edge of an upper surface of the vehicle.

For example, in embodiments in which the vehicle is a camping trailer, the at least one vehicle mount may be mounted to a portion at or near a forward edge, an opposed rear edge or an opposed side edge of an upper surface of the trailer.

Likewise in embodiments in which the vehicle is a powered vehicle, such as, e.g., an SUV, a four-wheel-drive vehicle or a van, the at least one vehicle mount may typically be mounted to a portion at or near a side edge or rear edge of an upper surface of a roof of the vehicle.

The at least one vehicle mount may be of any suitable size, shape and construction to mount to the at least a portion of the vehicle. The mount may be mounted fixedly or detachably to the at least a portion of the vehicle.

The vehicle mount may include a base, a rim and at least one wall extending from the base to the rim, preferably orthogonally.

The rim may extend from an upper portion of the at least one wall and may extend along an edge of the at least one wall.

The base may have a vehicle abutting surface and an opposed outer surface and may be of any suitable shape. In some embodiments, the base may be in the shape of a circle or oval. In some embodiments, the base may be in the shape of a triangle, square, rectangle, pentagon, hexagon or octagon, for example.

In preferred embodiments, the mount may include a substantially rectangular base having opposed end edges and opposed longitudinal side edges. The mount may further include at least two opposed sidewalls extending upwardly from the opposed longitudinal side edges, an end wall extending upwardly from an end edge and a free end edge (i.e. no wall extending up from the edge). The walls may preferably extend orthogonally upwards from the base to the rim.

Each of the opposed sidewalls may further include a corner forming wall extending from a side of the sidewall and connectable with the end wall with one or more mechanical fasteners (e.g., threaded fasteners).

Each of the opposed sidewalls may at least partially extend along the opposed longitudinal side edges. Preferably, the sidewalls may taper towards the free end edge.

The base and the walls of the vehicle mount may advantageously define a space for at least partially receiving and accommodating the at least one arm when in the retracted position.

In some embodiments, the rim of the vehicle mount may further include one or more lip portions extending outwardly from the rim. The lip portions may extend outwardly from the rim at an obtuse angle relative to the base. In use, the lip portions may facilitate in guiding the at least one arm at least partially within the space defined by the base and the walls of the vehicle mount.

The vehicle mount and the at least a portion of the vehicle may typically be fastened together by one or more fasteners.

The one or more fasteners may include one or more mechanical fasteners and/or one or more chemical fasteners.

In one such embodiment, the vehicle abutting surface of the vehicle mount may be fastened to the at least a portion of the vehicle by one or more chemical fasteners. For example, the one or more chemical fasteners including a wet adhesive, a dry adhesive and/or double-sided adhesive tape may extend between the vehicle abutting surface of the vehicle mount and the at least a portion of the vehicle.

In another such embodiment, the vehicle abutting surface of the vehicle mount may be fastened to the at least a portion of the vehicle by one or more mechanical fasteners. For example, the one or more mechanical fasteners including threaded fasteners and/or rivets may extend through respective openings defined in the vehicle mount and within openings defined in the at least a portion of the vehicle.

In yet other embodiments, the vehicle mount may be fastened to the at least a portion of the vehicle by one or more loops, straps or bands, for example.

In one such embodiment, a loop, strap or band may extend from a location at or near an edge of an upper surface of the at least a portion of the vehicle and be coupled to, looped over or hooked over at least a portion or part of the vehicle mount.

In some embodiments, the vehicle mount may be fastened to the at least a portion of the vehicle by a connecting mechanism or part of a connecting mechanism. The connecting mechanism or part of the connecting mechanism may be of integral formation with the vehicle mount.

The connecting mechanism may include mateable male and female formations that couple together, such as, e.g., a threaded connection, an interference (snap-fit) connection, a bayonet-type connection or a hook-and-loop type connection.

For example, in one such embodiment, the connecting mechanism may include a male formation associated with the vehicle mount configured to be inserted into or coupled with a female formation associated with the at least a portion of the vehicle. Conversely, in another such embodiment, the connecting mechanism may include a female formation associated with the vehicle mount configured to at least partially receive or be coupled with a male formation associated with the at least a portion of the vehicle.

In some embodiments, the base of the vehicle mount may further include at least one mounting extension extending from the base and defining at least one opening for receiving a fastener, such as, e.g., a mechanical fastener as described above, for fastening the vehicle mount to the at least a portion of the vehicle. The at least one mounting extension may typically extend from the base at a location at or near the free end edge, preferably from a portion of a longitudinal side edge adjacent the free end edge.

In some embodiments, the vehicle mount may further include a mounting bracket connectable to a sidewall of the vehicle mount and the at least a portion of the vehicle. Preferably, the bracket may have a substantially L-shaped profile and be connectable to a sidewall extending from a longitudinal side edge of the base and an adjacent portion of the vehicle.

As indicated above, the vehicle awning is mounted to the awning support by the at least one vehicle awning mount Like with the vehicle mount, the vehicle awning mount may be of any suitable size, shape and construction to mount to at least a portion of the vehicle awning, preferably a vehicle facing surface of the vehicle awning. Again, the vehicle awning mount may be mounted fixedly or detachably to the at least a portion of the vehicle awning, preferably detachably.

In some embodiments, the vehicle awning mount may be in the form of a holder configured to at least partially receive and hold at least a portion of the vehicle awning, preferably an end portion.

In other embodiments, the vehicle awning mount may include a mounting plate configured to abut and be fastened to at least part of the vehicle facing surface of the vehicle awning with one or more fasteners, preferably releasably.

In one such embodiment, the vehicle awning mount may further include a rim and at least one wall extending from the mounting plate to the rim.

As with the vehicle awning mount, the rim may extend along an edge of the at least one wall.

The mounting plate may have an awning abutting surface and an opposed outer surface and may be of any suitable shape. In some embodiments, the mounting plate may be in the shape of a circle or oval. In some embodiments, the base may be in the shape of a triangle, square, rectangle, pentagon, hexagon or octagon, for example.

In preferred embodiments, the vehicle awning mount may include a substantially quadrilateral-shaped mounting plate having opposed end edges and opposed longitudinal side edges.

The vehicle awning mount may further include at least two opposed sidewalls extending from the opposed longitudinal side edges and an end wall extending from an end edge. Like with the vehicle mount, the vehicle awning mount may preferably include a free end edge (i.e. no wall extending from the edge). In some embodiment the free end edge may be angled.

The walls may preferably extend orthogonally away from the mounting plate to define a space for at least partially receiving an end of the at least one arm.

In some embodiments, the rim of the awning mount may further include one or more lip portions extending inwardly from the rim along one or more of the walls to, in use, pivotally couple with the end of the at least one arm. This will be described in detail later. The lip portions may extend orthogonally inward from the rim, preferably from the rim of the end wall.

As with the vehicle mount, the vehicle awning mount and the at least a portion of the vehicle awning may typically be fastened together by one or more fasteners.

The one or more fasteners may include one or more mechanical fasteners and/or one or more chemical fasteners.

In one such embodiment, the awning abutting surface of the mounting plate of the vehicle awning mount may be fastened to the at least a portion of the vehicle awning by one or more chemical fasteners. For example, the one or more chemical fasteners including a wet adhesive, a dry adhesive and/or double-sided adhesive tape may extend between the awning abutting surface and the at least a portion of the vehicle awning, preferably at least a portion of the vehicle facing surface of the vehicle awning.

In another such embodiment, the awning abutting surface of the mounting plate of the vehicle awning mount may be fastened to the at least a portion of the vehicle awning by one or more mechanical fasteners. For example, the one or more mechanical fasteners including threaded fasteners and/or rivets may extend through respective openings defined in the mounting plate of the vehicle awning mount and within openings defined in the at least a portion of the vehicle.

In yet other embodiments, the vehicle awning mount may be fastened to the at least a portion of the vehicle awning by one or more loops, straps or bands, for example, as previously described.

In some embodiments, the vehicle awning mount may be fastened to the at least a portion of the vehicle awning by a connecting mechanism or part of a connecting mechanism. The connecting mechanism or part of the connecting mechanism may be of integral formation with the vehicle awning mount.

The connecting mechanism may include mateable male and female formations that couple together, such as, e.g., a threaded connection, an interference (snap-fit) connection, a bayonet-type connection or a hook-and-loop type connection.

For example, in one such embodiment, the connecting mechanism may include a male formation associated with the vehicle awning mount configured to be inserted into or coupled with a female formation associated with the at least a portion of the vehicle awning, preferably a vehicle facing surface of the vehicle awning.

Conversely, in another such embodiment, the connecting mechanism may include a female formation associated with the vehicle awning mount configured to at least partially receive or be coupled with a male formation associated with the at least a portion of the vehicle awning, preferably a vehicle facing surface of the vehicle awning.

The at least one arm may be of any suitable size, shape and construction to extend between the at least one vehicle mount and the at least one vehicle awning mount and be moveable between a retracted position in which the vehicle awning is located adjacent the at least a portion of the vehicle and an extended position in which the vehicle awning is extended outwardly relative to the at least a portion of the vehicle.

Preferably, the at least one arm may extend the vehicle awning in a substantially vertical direction relative to the vehicle.

Typically, the arm may be elongate longitudinally extending between opposed ends, including first and second ends.

In preferred embodiments, the arm may be in the form of a beam. The beam may be formed from sheet metal. Alternatively, the beam may be of tubular or solid construction, typically tubular with a substantially rectangular-shaped cross section. In one embodiment, the beam is formed from plastic or polymeric material by injection moulding or other like plastic part production process.

The arm may include an upper surface, an opposed lower surface, opposed sides, and the opposed ends, including the first end and the second end. In some embodiments, the upper surface and/or the lower surface of the arm may include one or more cut outs to at least partially reduce the weight of the arm.

The arm may extend from the first end to the second end between the mounts and may be of any suitable length. A person skilled in the art will appreciate that the length of the at least one arm may determine the height that the vehicle awning may be extended above the vehicle.

Generally, the at least one arm may be of any length that may extend the vehicle awning a suitable height above the vehicle that a person may stand upright comfortably beneath the awning when extended. For example, the at least one arm may have a length of at least 300 mm, at least 350 mm, at least 400 mm, at least 450 mm, at least 500 mm, at least 550 mm, at least 600 mm, at least 650 mm, at least 700 mm, at least 750 mm, at least 800 mm, at least 850 mm, at least 900 mm, at least 950 mm, at least 1,000 mm, at least 1,050 mm, at least 1,100 mm, at least 1,150 mm, at least 1,200 mm, at least 1,250 mm, at least 1,300 mm, at least 1,350 mm, at least 1,400 mm, at least 1,450 mm or at least 1,500 mm.

The first end of the arm may be pivotally coupled to the vehicle mount by any suitable means that allows the arm to pivot about the first end and the second end to be pivotable between the retracted and extended positions.

Likewise, the second end of the arm may be pivotally coupled to the vehicle awning mount by any suitable means that allows the vehicle awning mount to pivot about the second end.

Generally, in use, in the retracted position the at least one arm may extend in a substantially horizontal direction along the vehicle. Conversely, in the extended position the at least one arm may pivot about the first end such that the second end is raised relative to the first end to extend the vehicle awning mount and associated vehicle awning in substantially vertical direction relative to the vehicle.

In some embodiments, the arm may be pinned to the vehicle mount at the first end by a pivot pin. Similarly, the arm may be pinned to the vehicle awning mount at the second end by another pivot pin.

In some such embodiments, the first and second ends of the arm may each further include a bearing to be pivotally coupled to a respective mount by a pivot pin. The bearing may or may not include a polymer bushing.

In other embodiments, the arm may include a bore defined in the opposed sidewalls at or near each end and the vehicle mount and the vehicle awning mount may each include corresponding bores configured to be respectively pinned to either end of the arm by a pivot pin when the bores are co-aligned.

In some embodiments, the awing support may further include at least one strut extending between the vehicle awning mount and the arm for stabilizing movement of the arm relative to the vehicle awning mount. The strut may be of any suitable size, shape and form.

Generally, the strut may extend longitudinally between opposed ends. The strut may be a hydraulic or pneumatic strut. Preferably, the strut may be a gas strut. In one embodiment, the strut is electrically actuated.

The strut may typically be pivotally coupled at a lower end to the vehicle mount and at an upper end to a portion of the arm, preferably at or near the second end. The lower surface of the arm may define a corresponding opening to at least partially accommodate the strut when in the retracted position. The strut may be pivotally coupled by any suitable way known in the art.

In use, the strut may at least partially facilitate in movement of the arm between the retracted and extended positions and/or in at least partially retaining the arm in a desired position.

Specifically, the strut in use may at least partially oppose the force of gravity and at least partially assist in moving the awning support from the retracted position to the extended position and in at least partially preventing the support from moving to the retracted position when at least partially extended.

In some embodiments, the at least one arm may be an articulated arm including at least one articulation and at least two arms.

The articulated arm may include more than one articulation and more than three arms. For example, in one such embodiment, the articulated arm may include at least two articulations and at least three arms. Such an embodiment may be advantageous when a greater extension height is required than is provided with only one articulation.

In preferred embodiments, the at least one arm may be an articulated arm including a lower arm and an upper arm pivotally coupled together. The articulated arm may be articulated in such a way that the upper arm and the lower arm may fold relative to one another when in the retracted position.

Specifically, when in the retracted position, the lower arm may extend in a substantially horizontal direction across the vehicle mount and the upper arm may likewise extend in a substantially horizontal direction across the lower arm. Conversely, when in the extended position, the lower arm may pivot away from the vehicle mount and the upper arm may pivot away from the lower arm to extend the vehicle awning mount and an associated said vehicle awning in a substantially vertical direction above the vehicle.

The lower arm and the upper arm may each typically be in the form of a beam. The beam may be of tubular or solid construction, typically tubular with a substantially rectangular shaped cross section.

Both the lower arm and the upper arm may each include an upper surface, an opposed lower surface, opposed sides, a first end and an opposed second end.

The lower arm may be pivotally coupled to the vehicle mount at the first end and pivotally coupled to the upper arm at the second end. Likewise, the upper arm may be pivotally coupled to the second end of the first arm at the first end and be pivotally coupled to the vehicle awning mount at the second end.

The lower arm and the upper arm may be pivotally coupled to the respective mounts and each other in any suitable way that allows:

the lower arm to pivot about its first end and for its second end to be pivotable between the retracted and extended positions;

the upper arm to be pivot about its first end and for its second end to be pivotable between the retracted and extended positions; and the vehicle awning mount to pivot about the second end of the upper arm.

For example, in some embodiments, the ends of the lower arm and the upper arm may be pivotally coupled as described above.

In other embodiments, however, the lower arm may include a bore extending between the opposed sides at or near each of the ends, and the vehicle mount may include a corresponding bore defined in the opposed sidewalls (and the mounting bracket, if present) adjacent the end wall. The first end of the lower arm may be at least partially received between the opposed sidewalls and pinned to the vehicle mount by a pivot pin received through the bores when co-aligned.

Similarly, the upper arm may include a bore extending between the opposed sides at or near the second end and the mounting plate of the vehicle awning mount together with a corresponding lip portion associated with the rim on the end wall of the vehicle awning mount may each define corresponding bores. The second end of the upper arm may be at least partially received between the mounting plate and the corresponding lip portion and pinned to the vehicle awning mount by a pivot pin received through the bores when co-aligned.

Similarly, the first end of the upper arm may further include a pair of opposed protruding connecting members extending downwardly from the lower surface of the upper arm at or near the first end. Each of the opposed protruding connecting members may have a bore therethrough. The opposed protruding connecting members may be configured to at least partially receive the second end of the lower arm therebetween and be pinned to the second end of the lower arm by a pivot pin received through the bores when co-aligned.

In some embodiments, the awning support may further include at least one strut extending between the lower arm and the upper arm of the articulated arm for stabilizing movement of the upper arm relative to the lower arm. The strut may be of any suitable size, shape and form.

The strut may typically be pivotally coupled at a lower end to the lower arm, preferably at or near a location near the first end of the lower arm, and at an upper end to the upper arm, preferably at a location at or near the first end of the upper arm. The upper surface of the lower arm and the lower surface of the upper arm may each typically define corresponding openings to at least partially accommodate the strut when the articulated arm is in the retracted position. The strut may be pivotally coupled by any suitable way known in the art.

In use, the strut may at least partially facilitate in movement of the articulated arm between the retracted and extended positions and/or in at least partially retaining the articulated arm in a desired position.

Specifically, the strut, in use, may at least partially oppose the force of gravity and at least partially assist in moving the awning support from the retracted position to the extended position and in at least partially preventing the support from moving to the retracted position when at least partially extended.

In some embodiments, the awning support may further include one or more retaining mechanisms for retaining the awning support in a retracted position and/or at least in a partially extended position. The one or more retaining mechanism may be of any suitable size, shape and construction.

For example, in one such embodiment, the retaining mechanism may include a hook fastened to an outer surface of an end wall of the vehicle awning mount and a corresponding clasp or clip fastened adjacent the end wall of the vehicle mount to, in use, at least partially hook or clip over the hook and retain the vehicle awning support in the retracted position.

Conversely, in another such embodiment, the retaining mechanism may include a hook fastened to an outer surface of an end wall of the vehicle mount and a corresponding clasp or clip fastened to an outer surface of the end wall of the vehicle awning mount to, in use, at least partially hook or clip over the hook and retain the vehicle awning support in the retracted position.

In another such embodiment, the retaining mechanism may include a latch pivotally coupled to a side of one of upper arm and lower arm and a projection extending outwardly from a like side of the other of the upper arm and the lower arm. The latch may pivotally coupled at one end and have a hook defined at the other end for hooking over the projection when the articulated arm is at least partially extended to retain the vehicle awning in the at least partially extended position.

In some embodiments, the awning support may further include a linear actuator operatively associated with the at least one arm for moving the arm between the retracted and extended positions. The linear actuator may be powered, such as, e.g., a pneumatic ram, a hydraulic ram or a rigid chain actuator.

According to a third aspect of the present invention, there is provided a method of adjusting the height of a vehicle awning relative to a vehicle with at least one said vehicle awning support according to the first aspect, said method including:

raising or lowering the awning between the retracted and extended positions until the vehicle awning is located at a desired height above the awning support.

The method may include one or more characteristics of the awning support and awning assembly as hereinbefore described.

For example, the vehicle awning may preferably be supported by at least two awning supports mounted at or near each end of the vehicle awning.

Preferably the at least two awning supports may be mounted along an edge of an upper surface of the vehicle and be moveable between the retracted position in which the awning supports are located atop the vehicle and the extended position in which the awning supports extend in a substantially vertical direction above the vehicle.

The method may optionally include an initial step of unfastening any retaining mechanisms retaining the at least one awning support in place so that it may be moveable.

The raising or lowering may advantageously by able to be undertaken by a single user. The user may manually raise or lower the vehicle awning to thereby move the awning supports between the retracted and extended positions.

When the vehicle awning is located at a desired height, the method may optionally further include retaining the awning support at the desired height. The retaining may include fastening one or more of the retaining mechanisms of the awning support to retain the awning support in the retracted position or in an at least partially extended position.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

Figure 1A:
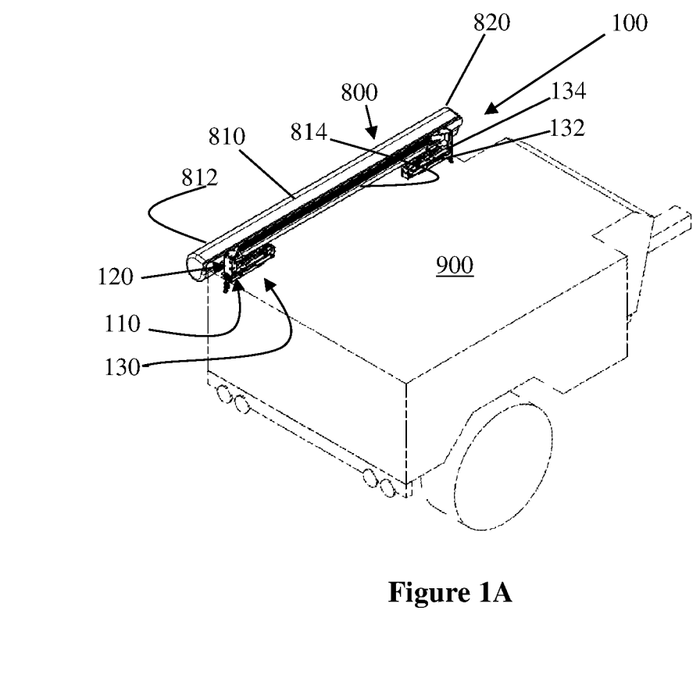
FIG. 1A shows an upper perspective view of a vehicle awning mounted to a side of an upper surface of a vehicle with a pair of vehicle awning supports according to an embodiment of the present invention. The vehicle awning supports are shown in retracted positions.
Figure 1B:
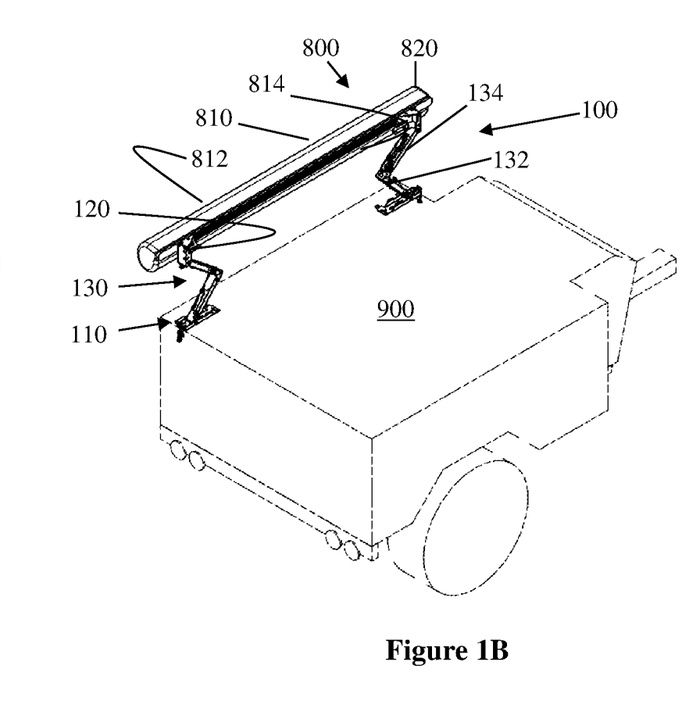
FIG. 1B shows the vehicle, the vehicle awning and the pair of vehicle awning supports shown in FIG. 1A but with the awning supports shown in extended positions.

FIGS. 1A and 1B show a pair of awning supports (100) according to an embodiment of the present invention mounted along a side edge of an upper surface of a camping trailer (900) and supporting vehicle awning (800) atop the trailer (900).

FIG. 1A shows the pair of awning supports (100) in retracted positions in which the vehicle awning (800) sits atop the upper surface of the trailer (900).

In contrast, FIG. 1B shows the pair of awning supports (100) in an extended position in which the vehicle awning (800) is extended in a substantially vertical direction above the trailer (900). Advantageously, in the extended position, the vehicle awning (800) may be extended outwardly in a substantially horizontal direction from the trailer (900) and provide sufficient clearance beneath the vehicle awning (800) for a person to comfortably stand upright.

The vehicle awning (800) includes an elongate housing (810) extending longitudinally between opposed ends (820). The elongate housing (810) houses a retractable awning (not visible) within the housing (810).

The elongate housing (810) includes an outward facing surface (812) and an opposed vehicle facing surface (814) extending between the opposed ends (820).

The front surface (812) includes an elongate opening (not visible) extending at least partially between the opposed ends (820) through which the retractable awning (not shown) can be extended.

The vehicle facing surface (814) of the vehicle awning (800) is mounted at each end (820) to the awning supports (100).

Best shown in FIG. 1B, each awning support (100) includes a trailer mount (110; i.e., a vehicle mount), a vehicle awning mount (120) and an articulated arm (130; i.e., at least one arm) extending between the mounts (110, 120). The articulated arm (130) includes a lower arm (132) and an upper arm (134).

In the retracted position as shown in FIG. 1A, the lower arm (132) of each awning support (100) extends in a substantially horizontal direction across the trailer mount (110) and the upper arm (134) likewise extends in a substantially horizontal direction atop the lower arm (132). The vehicle awning mount (120) and the vehicle awning (800) are located atop the upper arm (134).

Conversely, in the extended position as shown in FIG. 1B, the lower arm (132) of each awning support (100) pivots away from the trailer mount (110) and the upper arm (134) pivots away from the lower arm (132) to extend the vehicle awning mount (120) and the vehicle awning (800) in a substantially vertical direction above the trailer (900).

Figure 2:
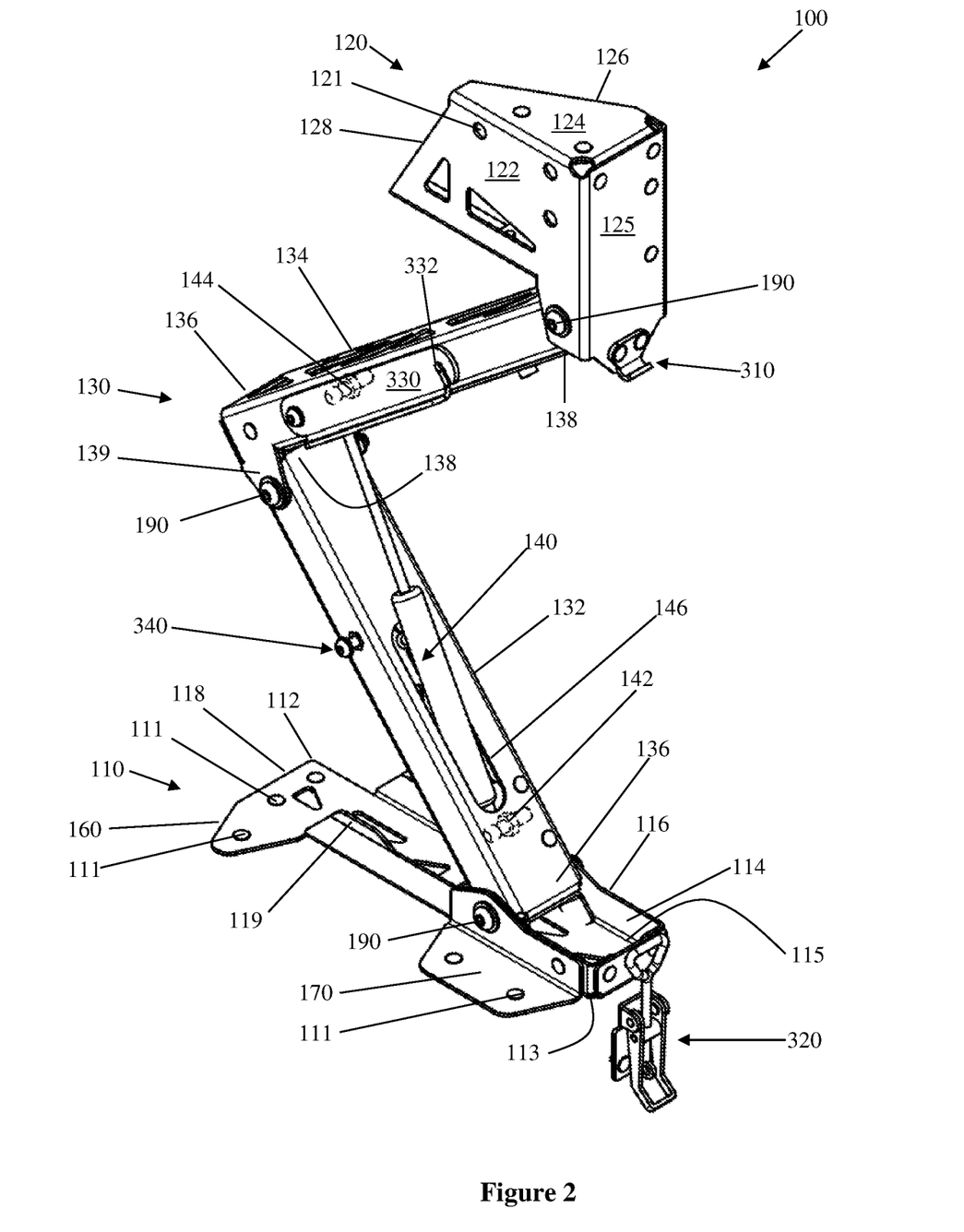
FIG. 2 shows an upper perspective view of a vehicle awning support as shown in FIG. 1A in the retracted position.

Referring to FIG. 2, the trailer mount (110) includes a substantially rectangular base (112) having a trailer abutting surface, an opposed outer surface, opposed end edges and opposed longitudinal side edges. The trailer mount (110) further includes opposed sidewalls (114) extending orthogonally upwards from opposed longitudinal side edges of the base (112) to a rim (116), an end wall (115) extending orthogonally upwards an end edge of the base (112) to a rim (116) and a free end edge (118).

The rim (116) extends from an upper portion of the walls (114, 115) and along an edge of the walls (114, 115).

Each of the opposed sidewalls (114) further includes a corner forming wall (113) extending from a side of the sidewall (114) and connectable with the end wall (115) by one or more mechanical fasteners (e.g., threaded fasteners).

As shown, each of the opposed sidewalls (114) only partially extends along the opposed longitudinal side edges of the base (112) and taper towards the free end edge (118).

Figure 3:
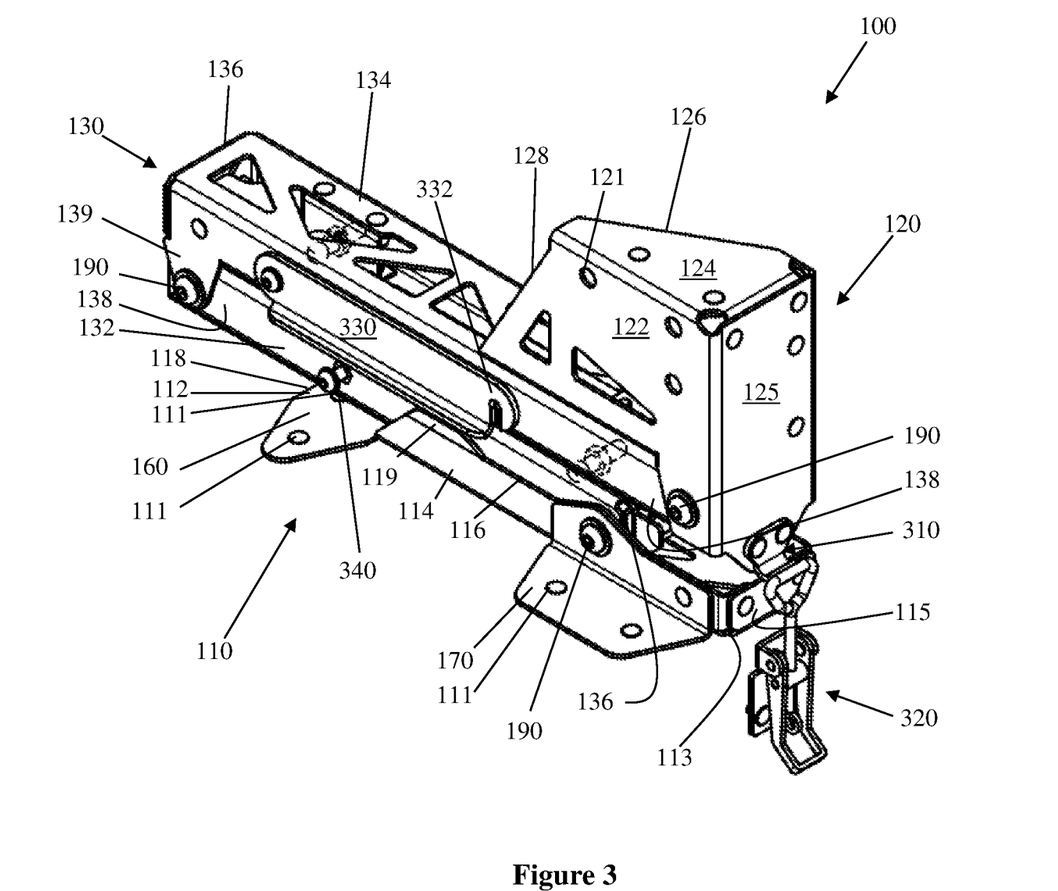
FIG. 3 shows an upper perspective of the vehicle awning support shown in FIG. 2 in the extended position.

Best shown in FIG. 3, the base (112) and the walls (114, 115) of the trailer mount (110) together advantageously define a space for at least partially receiving and accommodating the lower arm (132) when in the retracted position.

Turning back to FIG. 2, the rim (116) further includes one or more lip portions (119) extending outwardly from the rim (116) at an obtuse angle relative to the base (112) to facilitate in at least partially guiding the lower arm (132) within the space collectively defined by the base (112) and walls (114, 115) of the trailer mount (110).

The trailer mount (110) is fastened to an upper surface of the trailer (900; not shown) by one or more mechanical fasteners (i.e., threaded fasteners) extending through openings (111) defined in the base and within opening defined in the trailer (900; not shown).

The base (112) of the trailer mount (110) further includes a protruding portion (160; i.e., at least one mounting extension) extending from the base (112) from a longitudinal side edge adjacent the free end edge (118). Like the base (112), the protruding portion (160) also defines an opening (111) for receiving a mechanical fastener (i.e., a threaded fastener) for fastening the trailer mount (110) to the trailer (900; not shown).

The trailer mount (110) further include a mounting bracket (170) connectable to a sidewall (114) of the trailer mount (110) and a portion of the trailer (900; not shown). Like with the base (112) and the protruding portion (160), the bracket (170) defines two openings (111) in the portion connectable to the sidewall (114) of the trailer mount (110) each for receiving a mechanical fastener (i.e., a threaded fastener). Likewise, the bracket (170) defines two openings (111) in the portion connectable to the trailer (900; not shown) also for each receiving a mechanical fastener (i.e., a threaded fastener).

The vehicle awning mount (120) includes a mounting plate (122) configured to abut against and be fastened to a vehicle facing surface (814; not shown) of the vehicle awning (800; not shown) by three mechanical fasteners (i.e., threaded fasteners).

The mounting plate (122) is substantially rectangular in shape and includes a vehicle awning abutting surface, an opposed outer surface, opposed end edges and opposed longitudinal side edges. The mounting plate (122) further includes two opposed sidewalls (124) extending orthogonally from the longitudinal side edges of the mounting plate (122) to a rim (126) in a direction away from the vehicle awning abutting surface, an end wall (125) extending orthogonally from an end edge of the mounting plate (122) to a rim (126) in a direction away from the vehicle awning abutting surface and a free end edge (128).

As with the trailer mount (110), the rim (126) extends along an outer portion of the walls (124, 125) and along an edge of the walls (124, 125).

The walls (124, 125) together with the mounting plate (122) collectively define a space for at least partially receiving an end of the upper arm (134).

The rim (126) of the end wall (125) of the vehicle awning mount (120) further includes a lip portion extending inwardly from the rim (126) to, in use, be pivotally coupled with an adjacent end of the upper arm (134). This will be described in detail later. The lip portion extends orthogonally inwards from the rim (126).

As with the trailer mount (110), the vehicle awning mount (120) and the vehicle awning (800; not shown) are fastened together by one or more mechanical fasteners (i.e., treaded fasteners) received through openings (121) defined in the mounting plate (122).

As shown, the articulated arm (130), including the lower arm (132) and the upper arm (134), extends between the mounts (110, 120) and is configured to move between the retracted position (as shown in FIG. 3) and an extended position as shown presently in FIG. 2.

Each arm (132, 134) is in the form of a beam of tubular construction having a substantially rectangular cross section. Each arm (132, 134) includes an upper surface, an opposed lower surface, opposed sides and opposed ends, including a lower end (136; i.e., a first end) and an upper end (138; i.e., a second end).

The lower arm (132) is pivotally coupled to the trailer mount (110) at the lower end (136) and pivotally coupled to the upper arm (134) at the upper end (136).

Likewise, the upper arm (134) is pivotally coupled to the upper end (138) of the first arm (132) at the lower end (136) and is pivotally coupled to the vehicle awning mount (120) at the upper end (138).

The lower arm (132) includes a bore extending through the opposed sides at or near each of the ends (136, 138), and the trailer mount (110) include a corresponding bore defined in the opposed sidewalls (114) and the mounting bracket (170) adjacent the end wall (115). The lower end (136) of the lower arm (132) is received between the opposed sidewalls (114) and pinned to the trailer mount (110) by a pivot pin (190) received through the bores when co-aligned.

Similarly, the upper arm (134) includes a bore extending between the opposed sides at or near the upper end (138) and the mounting plate (122) of the vehicle awning mount (120) together with the lip portion associated with the rim (126) on the end wall (125) of the vehicle awning mount (120) each define corresponding bores. The upper end (138) of the upper arm (134) is received between the mounting plate (122) and the lip portion and pinned to the vehicle awning mount (120) by a pivot pin (190) received through the bores when co-aligned.

Similarly, the lower end (136) of the upper arm (134) further include a pair of opposed protruding connecting members (139) extending downwardly from the lower surface of the upper arm (134) at or near the lower end (136). Each of the opposed protruding connecting members (130) includes a bore therethrough. The opposed protruding connecting members (139) receive the upper end (138) of the lower arm (132) therebetween, which is pinned to the upper arm (134) by a pivot pin (190) received through the bores when co-aligned.

As shown, the awing support (100) further includes a gas strut (140) extending between the lower arm (132) and the upper arm (134) of the articulated arm (130).

The gas strut (140) is pivotally coupled at a lower end (142) to the lower arm (132) at a location near the lower end (136) of the lower arm (132) and at an upper end (144) to the upper arm (134) at a location at or near the lower end (136) of the upper arm (134). The upper surface of the lower arm (132) and the lower surface of the upper arm (134) each define corresponding openings (146) to at least partially accommodate the strut (140) when the articulated arm (130) is in the retracted position.

In use, the strut (140) at least partially facilitates in movement of the articulated arm (130) between the retracted and extended positions and/or in at least partially retaining the articulated arm (130) in a desired position.

Best shown in FIG. 3, awning support (100) further includes retaining mechanisms for retaining the awning support (100) in the retracted position and in at least a partially extended position.

For retaining the awning support (100) in the retracted position, the awning support (100) includes a hook (310) fastened to an outer surface of the end wall (125) of the vehicle awning mount (120) and a corresponding clasp (320) fastened adjacent the end wall (115) of the trailer mount (110) to the trailer (900; not shown) and configured to hook or clip over the hook (310) and retain the awning support (100) in the retracted position.

For retaining the awning support (100) in at least a partially extended position, the awning support (100) further includes a latch (330) pivotally coupled to a side of the upper arm (134) and a projection (340) extending outwardly from a like side of the lower arm (132). The latch (330) is pivotally coupled at one end and has a hook (332) defined at the other end for hooking over the projection (340) when the articulated arm (130) is at least partially extended to retain the vehicle awning (800; not shown) in the at least partially extended position.

A method of using the awning support (100) of the present invention is now described in detail with reference to FIGS. 1A and 1B.

As a starting point, the awning (800) is stowed atop the trailer (900) as shown in FIG. 1A.

Upon arriving at a desired location, a user releases the clasps (320; shown only in FIGS. 2 and 3) located on each awning support (100) so that the awning (800) is no longer retained in the retracted position.

The user than grips the vehicle awning (800) at or near a mid-point location extending between the opposed ends (820) and raises the awning (800) to a desired height above the trailer (900).

Once the awning (800) is at a desired height, the awning supports (100) by way of the gas struts (140; not visible) retain the awning (800) in the extended position as shown in FIG. 1B. The retractable awning (not visible) can then be extended from the housing (810).

When restoring the awning (800) to a stowage position atop the trailer (900) as shown in FIG. 1A, the awning (not visible) is retracted back into the housing (810).

The user then again grips the awning (800) at or near a mid-point location and lowers the awning (800) to the retracted position.

Before departing, the user can re-fasten the clasps (320; shown only in FIGS. 2 and 3) to retain the awning supports (100) and the awning (800) in the retracted position.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A vehicle awning assembly including:
a vehicle awning; and
at least one awning support for mounting the vehicle awning to a vehicle, said awning support including a vehicle mount for mounting the awning support to the vehicle, a vehicle awning mount for mounting the awning support to the vehicle awning, and an articulated arm extending between the mounts, the articulated arm comprising a lower arm pivotable relative to the vehicle mount and an upper arm pivotable relative to the lower arm,
said articulated arm being upwardly moveable between a retracted position in which the vehicle awning is located adjacent the vehicle and an extended position in which the vehicle awning is elevated above the vehicle, the vehicle awning being extendable laterally outward relative to the vehicle,
wherein when the articulated arm is in the retracted position, a lower surface of the lower arm abuts an outer surface of the vehicle mount.

2. A vehicle awning assembly as claimed in claim 1, wherein the articulated arm extends substantially parallel with the vehicle awning when the articulated arm is in the retracted position.

3. A vehicle awning assembly as claimed in claim 1, wherein the vehicle awning translates substantially vertically as the articulated arm moves from the retracted position to the extended position.

4. A vehicle awning assembly as claimed in claim 1, wherein the vehicle awning lies substantially flush with the vehicle when the articulated arm is in the retracted position.

5. A vehicle awning assembly as claimed in claim 4, wherein the at least one awning support includes a pair of awning supports located at or near either end of the vehicle awning, wherein the pair of awning supports define respective inwardly pointing elbows located above the vehicle.

6. A vehicle awning assembly as claimed in claim 5, wherein the pair of awning supports extend in a substantially horizontal direction along the vehicle when the articulated arm is in the retracted position.

7. A vehicle awning assembly as claimed in claim 1, further including the vehicle in the form of a camping trailer, the at least one awning support being mounted to a roof of the camping trailer at one side of the camping trailer.

8. A vehicle awning assembly as claimed in claim 1, wherein the articulated arm extends the vehicle awning in a substantially vertical direction.

9. A vehicle awning support for supporting a vehicle awning on a vehicle, said support including:
a vehicle mount for mounting the support to the vehicle;
a vehicle awning mount for mounting the support to the vehicle awning; and
an articulated arm extending between the mounts, the articulated arm comprising a lower arm pivotable relative to the vehicle mount and an upper arm pivotable relative to the lower arm, said articulated arm being upwardly moveable between a retracted position in which the vehicle awning is located adjacent the vehicle and an extended position in which the vehicle awning is elevated above the vehicle, the vehicle awning being extendable laterally outward relative to the vehicle,
wherein when the articulated arm is in the retracted position, a lower surface of the lower arm abuts an outer surface of the vehicle mount.

10. A vehicle awning support as claimed in claim 9, wherein the articulated arm defines an elbow, and includes a pair of supports that pivot about the elbow and are brought together in the retracted position.

11. A vehicle awning support as claimed in claim 9, further including a lock for locking the articulated arm in the retracted position.

12. A vehicle awning support as claimed in claim 9, further including a lock for locking the articulated arm in the extended position.

13. A vehicle awning support as claimed in claim 9, wherein each mount is pivotally mounted to the articulated arm.

14. A vehicle awning support as claimed in claim 9, further including an adjustment means for adjusting the articulated arm to a desired height, wherein the adjustment means includes an extensible gas strut.

15. A vehicle awning support as claimed in claim 9, wherein the vehicle mount includes mounting plates at spaced apart locations to facilitate stable mounting.

16. A vehicle awning support as claimed in claim 9, wherein the articulated arm defines apertures to reduce weight.

17. A method of adjusting the height of a vehicle awning relative to a vehicle fitted with a vehicle awning assembly,
the vehicle awning assembly including the vehicle awning and at least one awning support for mounting the vehicle awning to the vehicle,
said awning support including a vehicle mount for mounting the support to the vehicle, a vehicle awning mount for mounting the awning support to the vehicle awning, and an articulated arm extending between the mounts, the articulated arm comprising a lower arm pivotable relative to the vehicle mount and an upper arm pivotable relative to the lower arm,
the method comprising extending each support between a retracted position in which the vehicle awning is located proximal the vehicle and an extended position in which the vehicle awning is elevated above the vehicle,
wherein when the articulated arm is in the retracted position, a lower surface of the lower arm abuts an outer surface of the vehicle mount.

18. A method of adjusting as claimed in claim 17, further involving unlocking each support prior to extending.

19. A method of adjusting as claimed in claim 17, further involving locking each support in the extended position.

20. A method of adjusting as claimed in claim 17, further involving extending the vehicle awning laterally when each awning support is in an extended position.

* * * * *